Figure 1:
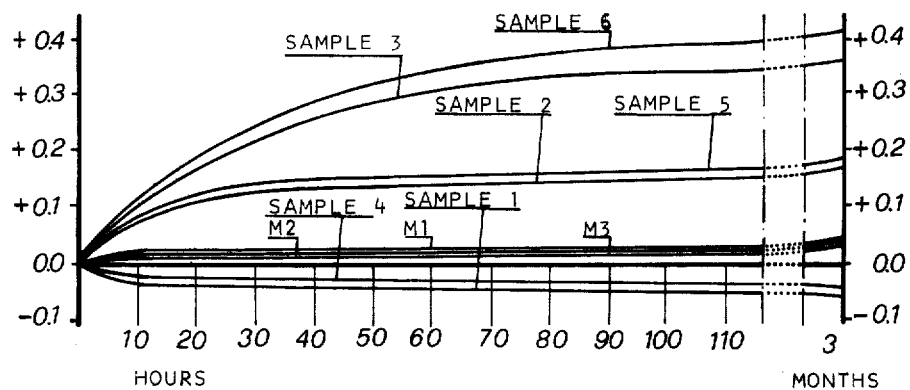

United States Patent [19]

Collepardi

[11] 4,046,583

[45] Sept. 6, 1977

[54] METHOD OF PRODUCING EXPANSIVE AND HIGH STRENGTH CEMENTITIOUS PASTES, MORTARS AND CONCRETES

[75] Inventor: Mario Collepardi, Rome, Italy

[73] Assignee: Emesa Aktiengesellschaft, Eschen, Liechtenstein

[21] Appl. No.: 684,727

[22] Filed: May 10, 1976

[30] Foreign Application Priority Data

May 9, 1975 Italy ................................ 84122/75

[51] Int. Cl.² ............................................... C04B 7/35
[52] U.S. Cl. ........................................ 106/90; 106/98
[58] Field of Search ................................ 106/98, 90

[56] References Cited

U.S. PATENT DOCUMENTS

| 2,751,308 | 6/1956 | Arrighini | 106/98 |
| 2,880,101 | 3/1959 | Ulfstedt | 106/98 |
| 3,676,541 | 7/1972 | Nishi et al. | 106/90 |

*Primary Examiner*—J. Poer
*Attorney, Agent, or Firm*—D. Paul Weaver

[57] ABSTRACT

Expansive and high strength cementitious pastes, mortars and concretes are produced by adding to a mix of water, cement and aggregates a mixture containing calcium oxide and/or magnesium oxide, a water-reducing agent and an additive for reducing or eliminating bleeding of the fresh mix.

14 Claims, 2 Drawing Figures

METHOD OF PRODUCING EXPANSIVE AND HIGH STRENGTH CEMENTITIOUS PASTES, MORTARS AND CONCRETES

This invention relates to a method of producing expansive and high strength cementitious pastes, mortars and concretes.

As known in the art, cement conglomerates (concretes, mortars or grouts) notably undergo contraction during hydration of the cement due to the evaporation of the water and/or the sedimentation of the inerts. In certain applications this phenomenon must be avoided as, for example, in sealing work in order to avoid the formation of cracks and to ensure maximum adherence of the mix to the confining perimeter. In the anchoring of machines to foundations this must be avoided in order to guarantee maximum support capacity and uniform static load distribution.

To attain this object it is known to add to the cement mix an expansive component capable of producing an increase in volume approximately equal to or greater than the contraction in volume which occurs during shrinkage. In this manner it is possible to prepare shrinkage-compensating or self-stressing concretes or mortars.

Known expansive component normally used for this purpose including the following:

calcium aluminates or sulphoaluminates, capable of producing an expanding component, namely ettringite, of composition $3CaO.Al_2O_3.3CaSO_4.32H_2O$, by means of a hydration reaction, such as:

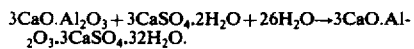

$$3CaO.Al_2O_3 + 3CaSO_4.2H_2O + 26H_2O \rightarrow 3CaO.Al_2O_3.3CaSO_4.32H_2O.$$

The compound obtained, namely ettringite, occupies a greater volume than the reacting solid.

metallic iron, which during hardening of the mix is transformed into ferric oxide and consequently causes an increase in volume of the entire mix.

Other expansive agents theoretically usable are calcium oxide (CaO) and magnesium oxide (MgO), as both form the corresponding hydroxides by reaction with water, leading to increase in volume. Calcium oxide in particular would have the advantage of being particularly economical as it is produced on a large scale for other uses.

In order for an expansive component to be advantageously used in a concrete or mortar, the expansion must take place within a certain time interval and in a sufficiently opposing environment. These circumstances depend upon the degree of hardening of the hydraulic binder, for example Portland cement, with which the expansive component is mixed. If expansion takes place too early with respect to the concrete hardening process, it is not able to induce any stress within the structure, as this latter becomes too deformed or cracked. On the other hand if expansion takes place too late with respect to the concrete hardening process, i.e. when this has attained high strength, the results are equally ineffective (P. Mehta and M. Polivka: "Expansive Cements" Acts of the VI International Congress on Cement Chemistry, pg. 15, Moscow, September 1974). In addition, most of the expansion should terminate within a relatively short period since in practice the moist curing periods — necessary to the expansion process — are usually short for practical reasons (M. Polivka "Factors influencing expansion of expansive cement concretes", American Concrete Institute, Special Publication 38, pg. 241).

Up to the present time neither calcium oxide nor magnesium oxide have been applied on a large scale because of the difficulty of controlling the oxide hydration and hence the expansion process in relation to the hardening of the hydraulic binder.

In U.S. Pat. No. 3,649,317, for example, it is proposed that this problem could be solved by delaying the expansion of calcium oxide by a pretreatment of the expanding agent with "Vinsol" (dodecylbenzenz sulphonate). However, by this treatment the above-mentioned drawbacks concerning a too long curing are not avoided.

The object of the invention is to provide a method of producing expansive and unusually high strength cementitous pastes, mortars and concretes by using calcium and/or magnesium oxide as the expansive agent.

According to the invention this object is attained by adding to a mix of water, cement and aggregates a mixture containing:

calcium oxide and/or magnesium oxide, and a water-reducing agent capable of reducing the water/cement ratio of the mix at least about 15% at constant workability, additives being also provided for reducing or completely eliminating the bleeding of the fresh mix.

Advantageously the water-reducing agent may consist of a polymer obtained by polycondensation of a free or salified sulphonic acid of the aromatic series with formaldehyde, and/or the polymer obtained by polycondensation of melamine with formaldehyde and containing free or salified sulphonic groups in the heterocyclic rings.

According to the invention the admixture may comprise silica ($SiO_2$) with a specific surface area of not less than $2 \times 10^4 cm^2/g$ determined by isothermal adsorption of a gas.

Figure 2:
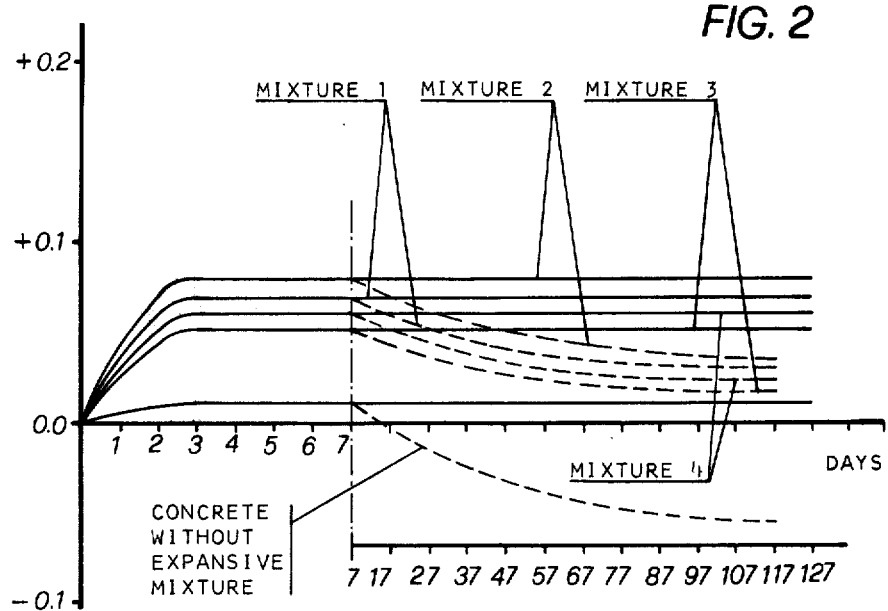

The present invention is further described in detail hereinafter and also by way of specific working embodiments, which are given for illustrative purposes only, and with reference to the accompanying figures, in which:

FIG. 1 is a graph which shows the progress with time of the percentage expansion of samples prepared with an expansive admixture according to the invention and, for comparison purpose, of samples prepared with known expansive admixtures, and FIG. 2 is a graph which shows the progress with time of the percentage expansion of samples prepared with further expansive admixtures according to the invention and, for comparison purpose, of a sample prepared without expansive admixture.

As stated, the admixture according to the invention contains the calcium and/or magnesium oxide and a water-reducing agent capable of reducing the water/cement ratio of the mix of water, cement and aggregates at least about 15% at constant workability.

The action of the calcium and magnesium oxide is to provide the expansion which can be advantageously utilized anticipating the hardening of cement by strongly reducing the water/cement ratio of the mix by the presence of the above-mentioned water-reducing agent. Furthermore, it has been discovered that the simultaneous presence of the two compounds in accordance with the present invention give an unexpected synergistic effect on the development of the strength.

The admixture so obtained is mixed with a hydraulic binder and inerts, and this may be done either at the place of use or preferably at the place of production, in order to supply the user with a premixed product of ready use and rigorously constant composition.

In any case, the admixture comprising the above mentioned expansive oxide(s) and the water-reducing agent, hydraulic binder and inerts, is mixed with water at the time of use.

The water-reducing agent according to the invention can be, for example, one of the following compounds:

polymer obtained by polycondensation of melamine with formaldehyde and containing free of salified sulphonic groups in the heterocyclic rings and represented by the formula:

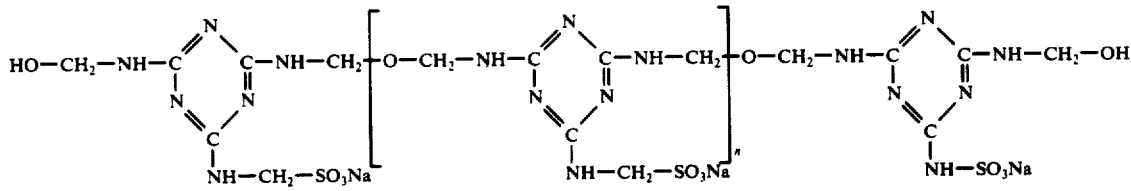

where $n = 1,2,3 \ldots$ polymer obtained by polycondensation of free or salified $\beta$-naphthalenesulphonic acid with formaldehyde and represented by the formula:

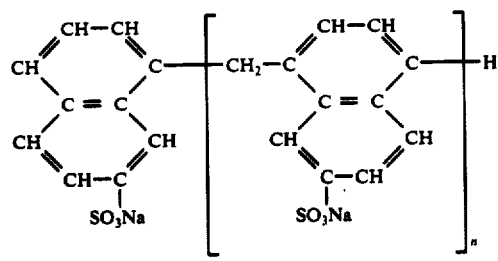

where $n = 1,2,3 \ldots$

As stated, the admixture according to the invention are mixed for use with a hydraulic binder and inerts. The hydraulic binder preferably consists of Portland cement, but pozzolanic, slag or aluminous cement may be used instead of it.

The percentage of the admixtures according to the invention relative to the weight of hydraulic binder to be used to make up a paste or a mortar or a concrete may vary from a minimum of 0.5% to a maximum of 40% according to the expansion or the strength to be obtained.

The inerts may be natural (for example sand) or metal based on iron, and the choice of one or other type depends on various factors and in particular on the characteristics which the cement conglomerate is to have. Thus if for example impact resistant characteristics are required, the use of metal inerts is preferred, while if wear resistant characteristics are required, natural inerts may be used, which are also of lower cost.

In the cases in which a very flowable mix is required, the presence of high specific surface silica can improve the performance of the mixture containing calcium and/or magnesim oxide and the water-reducing agent. In this ternary mixture calcium or magnesium oxide reacts with the water in the mix to form hydroxide, which in its turn reacts with the water and silica to form calcium or magnesium silicate hydrate in accordance with the reactions:

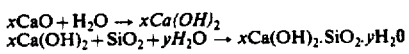

$$xCaO + H_2O \rightarrow xCa(OH)_2$$
$$xCa(OH)_2 + SiO_2 + yH_2O \rightarrow xCa(OH)_2 \cdot SiO_2 \cdot yH_2O$$

where $x$ varies from 0.8 to 2.

The introduction of silica into the expansive admixture and the consequent conversion of the calcium hydroxide into calcium silicate hydrate in accordance with the reaction given heretofore enable calcium oxide to be more advantageously used as in expansive agent, for the following reasons:

while calcium hydroxide has poor cementing properties, calcium silicate hydrate with a molar ratio of $CaO/SiO_2$ between 0.8 and 2, i.e. similar to that obtained in the hydration of Portland cement, has excellent binding characteristics;

while calcium hydroxide is easily washed away by water, especially if it contains carbon dioxide, calcium silicate hydrate is considerably less soluble and therefore more resistant to water action.

Instead of silica, a natural or artificial material of high specific surface area, in which silica is the predominant compound, could be used.

The ternary mixture containing calcium or magnesium oxide, water-reducing agent and silica may be used for anchoring machines (rotating, pulsating, vibrating) to foundations, for anchoring pins, for sealing column bases, for sealing plates, joints and pipes, for filling cavities and crevices, for laying bricks, tiles and floor tiles, for anchoring iron mesh for floors, for repairing holes.

The advantage of using specific surface silica is due to the fact that it considerably reduces bleeding when the mix is still fresh. The absence of bleeding is particularly important in all the above-mentioned applications.

The following examples will serve to further illustrate the invention, but are not intended to limit the characteristics of the admixtures prepared according to the invention and of the mixes obtained with them.

EXAMPLE 1

This example shows the unexpected synergistic effect on the strength of the admixture according to the invention. Furthermore only in the admixture according to the invention the hydration of calcium oxide can be advantageously utilized as the expansion takes place in a strongly opposing environment.

A mix containing 40% of Portland cement, 56% of sand and 4% of admixtures A, B, C according to table 1 has been prepared.

TABLE 1:

| Strength and expansion of mortars | | | | |
|---|---|---|---|---|
| Composition | | A | B | C |
| of admixture | | | | |
| Expansion (%) | | 0,10 | 0,00 | 0,06 |
| Strength | Flexural | 9 | 17 | 60 |

TABLE 1:-continued

| Strength and expansion of mortars | | | | |
|---|---|---|---|---|
| (Kg/cm$^2$) | Compressive | 77 | 108 | 402 |

A = 100% of CaO
B = 100% of polymer obtained by polycondensation of sodium salt of β-naphtalensulphonic acid with formaldehyde
C = 82% of CaO and 18% of the same polymer as in B All the mortars were mixed with enough water to obtain the same workability, as evaluated by measuring their drop table (140 mm). The percentages of mixing water were 22,0%, 13,0% and 13,5% for the mixes containing admixtures A, B, C respectively. The fresh mortars were cast into metal cylinders of 10 cm in height and 5 cm in diameter for subsequent measurement of the dimensional changes in the test pieces according to the Corp of Engineering Standard CRDC-589-70. The values of expansion shown in table 1 are measure of change in height of the samples from the final setting — evaluated by means of the soil test — and 1 day, after which no significant expansion took place.

The strength was measured on prismatic specimens (4×4×16cm) cured at 20° C for 1 day.

The results reported in table 1 show:
1. the synergistic effect on the strength of the admixture C according to the invention;
2. only in the admixture C according to the invention the hydration of calcium oxide is advantageously utilised as the expansion takes place in a strongly opposing environment due to the synergistic effect on the strength.

EXAMPLE 2

An admixture of the following composition by weight was prepared:
commercial lime (max. diameter 0.15 mm): 55%
amorphous silica with a specific surface area of 15×10$^4$cm$^2$/g: 35%
polymer obtained by polycondensation of formladehyde with sulphonated melamine: 10%

Samples were then prepared by mixing Portland cement, the above mentioned admixture, sand and/or particles of metallic iron, as indicated in Table 2.

TABLE 2:

| Percentage composition by weight of the prepared samples. | | | | |
|---|---|---|---|---|
| Sample | Cement | Admixture | Sand | Iron |
| 1 | 46.3 | — | 53.7 | — |
| 2 | 42.3 | 4.0 | 53.7 | — |
| 3 | 38.3 | 8.0 | 53.7 | — |
| 4 | 46.3 | — | 24.3 | 29.4 |
| 5 | 42.3 | 4.0 | 24.3 | 29.4 |
| 6 | 38.3 | 8.0 | 24.3 | 29.4 |

The Portland cement is of the high strength type (425 Kg/cm$^2$ at 28 days) in accordance with Italian standards for hydraulic binders. The sand is of siliceous type with a maximum particle size of 1.2 mm. The maximum particle size of the metallic inert is also 1.2 mm.

The samples shown in table 2 were mixed with water to prepare mortars all of the same workability, as evaluated by measuring their drop table (140 mm).

Three expansive commercial mortars were also examined, here called M1, M2, M3. These were also made up with the required amount of water to obtain a drop table flow of 140 mm.

The expansion and the strength values were obtained according to the methods described in Example 1.

The expansion results are shown in FIG. 1 in which the ordinate represents percentage expansion and the abscissa represents time in hours. The data show that the mortars prepared with samples No. 2, 3, 5, 6 of table 2, all according to the invention behave as expansive mortars.

The results concerning the strength are shown in table 3.

These data indicate that mortars prepared from samples 2, 5 and 6 of table 2, all according to the invention, have a strength which is considerably greated both than mortars without the expansive admixture (Samples 1 and 4) and mortars M1, M2, M3 commercially available. For example, after a curing of one day, the strength of mortars prepared from the admixture according to the invention is two or three times greater than that of all mortars.

TABLE 3

Flexural (F) and compressive strength (C) of mortars prepared from the samples indicated in table 2 and from certain commercially available products.

| | strength | | | | | | | |
|---|---|---|---|---|---|---|---|---|
| | 1 day | | 3 days | | 7 days | | 28 days | |
| | F | C | F | C | F | C | F | C |
| Sample 1 | 26 | 98 | 58 | 296 | 75 | 434 | 88 | 536 |
| Sample 2 | 70 | 317 | 85 | 632 | 88 | 805 | 101 | 1009 |
| Sample 3 | 71 | 318 | 85 | 463 | 89 | 600 | 95 | 702 |
| Sample 4 | 25 | 101 | 56 | 290 | 77 | 480 | 91 | 609 |
| Sample 5 | 78 | 339 | 98 | 663 | 118 | 830 | 131 | 1020 |
| Sample 6 | 67 | 254 | 95 | 580 | 115 | 670 | 120 | 980 |
| M 1 | 26 | 93 | 62 | 320 | 68 | 489 | 104 | 671 |
| M 2 | 26 | 105 | 56 | 284 | 74 | 444 | 88 | 570 |
| M 3 | 44 | 178 | 82 | 447 | 75 | 559 | 90 | 708 |

EXAMPLE 3

Four expansive admixture mixtures were prepared having the composition in table 4 and using the materials described in example 2 for lime, silica and polymer B and in example 1 for polymer A.

TABLE 4

| Percentage composition by weight of the expansive admixtures used for the concretes described in example 3 | | | | |
|---|---|---|---|---|
| Expansive admixture | 1 | 2 | 3 | 4 |
| Lime | 40 | 55 | 80 | 58 |
| Silica | 50 | 35 | 10 | 38 |
| Polymer A | 10 | — | — | — |
| Polymer B | — | 10 | 10 | 4 |

Polymer A
Polymer obtained by polycondensation of a sodium salt of β-naphtalensulphonic with formaldehyde.
Polymer B
Polymer obtained by polycondensation of melamine with formaldehyde and containing free or salified sulphonic groups in the heterocyclic rings.

Concretes having the following composition were prepared with expansive admixtures:
normal Portland cement: 320 Kg/m$^3$
expansive admixture: 30 Kg/m$^3$
inerts having a maximum diameter of 2.5 cm and containing 40% by weight sand: 1900 Kg/m$^3$ Analogous concrete was prepared without the expansive mixture and containing 350 Kg/m$^3$ of the same normal Portland cement. The quantity of mix water used was such as to obtain the same workability (8cm slump) of all concretes. Prsimatic test pieces of size 5×5×30 cm were prepared from these concretes. Each test piece comprised two reference points spaced approximately 25 cm apart to enable the percentage change in length to be measured. Cubic test pieces (15 cm side) were also prepared for measuring the compressive strength after curing for 1, 7 and 28 days. One half of the prismatic test pieces and all the cubic test pieces were preserved at 20° C in an environment saturated with water vapour (relative humidity 100%). The remaining prismatic test pieces were preserved under the conditions heretofore described for 7 days and at 20° C and relative humidity 50% for the remainder of the time.

FIG. 2 shows the dimensional changes in the prismatic test pieces as a function of time. The dashed curves refer to test pieces preserved in air at a relative humidity of 50% while the continuous curves refer to test pieces preserved in an enviroment saturated with water vapour. The results show that during the first 7 days in a relative humidity of 100% the concretes containing the expansive admixture of table 4, all according to the invention, show a greater expansion than the concrete without the expansive admixture. After the first seven days, all the concretes contract because of water evaporation. However those containing the expansive admixture show a dimension greater than the initial dimension because of the greater expansion which had occurred during curing in humid conditions, to the extent that net shrinkage during evaporation did not occur. This is indicated by the fact that the curves remain above the zero line. However the concrete without the expansive admixture underwent a contraction such that after only one day from the beginning of evaporation, a material shrinkage occurred.

The results relative to the compressive strength of the concretes are shown in table 5.

Table 5

| Compressive strength (Kg/cm²) of the concretes using the expansive mixtures of table 4. | | | |
|---|---|---|---|
| Expansive Mixture used | Curing | | |
| | 1 day | 7 days | 28 days |
| — | 94 | 311 | 438 |
| 1 | 139 | 400 | 540 |
| 2 | 168 | 412 | 570 |
| 3 | 149 | 401 | 530 |
| 4 | 103 | 320 | 444 |

These results show that it is possible to prepare concretes with the admixtures according to the invention which are expansive and which have compressive strength greater than that of the analogous concrete without the expansive admixture.

The following specific compounds will serve to further illustrate examples of water-reducing agents that may be employed in the practice of the invention:

a polymer obtained by polycondensation of a free or salified sulphonic acid of the aromatic series, with formaldehyde a polymer obtained by polycondensation of melamine with formaldehyde and containg free or salified sulphonic groups in the heterocyclic rings a polymer obtained by polycondensation of free or salified -naphthalenesulfonic acid with formaldehyde a polymer obtained by polycondenstion of free or salified phenolsulphonic acid, with formaldehyde a polymer obtained by polycondensation of free or salified benzene sulphonic acid, with formaldehyde a polymer obtained by polycondensation of a free or salified sulphonic acid of the aromatic series with formaldehyde, and containing methyl groups.

a polymer obtained by polycondensation of a sodium salt of a sulphonic acid of the aromatic series, with formaldehyde.

What is claimed is:

1. A method for producing expansive and high strength cementitions pastes, mortars, and concretes, comprising adding to a mix of water, cement and aggregates a mixture containing: a compound selected from the group consisting of calcium oxide, magensium oxide or mixture thereof, and a water-reducing agent capable of reducing the water/cement ratio of the mix at least about 15% at constant workability.

2. The method in accordance with claim 1 wherein the said oxide consists of commercial lime.

3. The method in accordance with claim 1 wherein the water-reducing agent comprises a polymer obtained by polycondensation of a free or salified sulphonic acid of the aromatic series, with formaldehyde.

4. The method in accordance with claim 1 wherein the water-reducing agent comprises a polymer obtained by polycondensation of melamine with formaldehyde and containing free or salified sulphonic groups in the heterocyclic rings.

5. The method as defined in claim 3 wherein the water-reducing agent consists of the polymer obtained by polycondensation of free or salified $\beta$-naphthalenesulphonic acid with formaldehyde.

6. The method as defined in claim 3 wherein the water-reducing agent consists of a polymer obtained by polycondensation of free or salified phenolsulphonic acid, with formaldehyde.

7. The method in accordance with claim 3 wherein the water-reducing agent consists of a polymer obtained by polycondensation of a free or salified benzene sulphonic acid, with formaldehyde.

8. The method in accordance with claim 3 wherein the water-reducing agent consists of a polymer obtained by polycondensation of a free or salified sulphonic acid of the aromatic series with formaldehyde, and containing methyl groups.

9. The method as defined in claim 8 wherein the water-reducing agent consists of a polymer obtained by polycondensation of a sodium salt of a sulphonic acid of the aromatic series, with formaldehyde.

10. The method in accordance with claim 1 wherein the percentage of the mixture is 0.5–40% by weight of said cement.

11. The method in accordance with claim 1 comprising adding to the mixture an additive for reducing the bleeding of the resulting mix.

12. The method in accordance with claim 11 wherein said additive is silica ($SiO_2$) having a specific surface area of not less than $2 \times 10^4$ cm²/gr determined by isothermal adsorption of a gas.

13. The method in accordance with claim 12 wherein the mixture has the following composition by weight: calcium oxide 45–65%; silica 30–50%; and water-reducing agent 1–12%.

14. The method in accordance with claim 12 wherein the percentage of the mixture is 0.5–40% by weight of cement.

* * * * *